United States Patent
Engwer et al.

(10) Patent No.: US 7,366,103 B2
(45) Date of Patent: Apr. 29, 2008

(54) SEAMLESS ROAMING OPTIONS IN AN IEEE 802.11 COMPLIANT NETWORK

(75) Inventors: Darwin A. Engwer, Pleasanton, CA (US); Jonathan M. Zweig, Cupertino, CA (US)

(73) Assignee: Nortel Networks Limited, St. Laurent, Quebec (CA)

( * ) Notice: Subject to any disclaimer, the term of this patent is extended or adjusted under 35 U.S.C. 154(b) by 182 days.

(21) Appl. No.: 09/753,227

(22) Filed: Dec. 28, 2000

(65) Prior Publication Data
US 2003/0193895 A1    Oct. 16, 2003

Related U.S. Application Data

(60) Provisional application No. 60/226,403, filed on Aug. 18, 2000.

(51) Int. Cl.
*H04J 3/14* (2006.01)
*H04L 12/56* (2006.01)
*H04Q 7/20* (2006.01)

(52) U.S. Cl. .............. 370/252; 370/410; 455/452.1

(58) Field of Classification Search ........ 370/241–253, 370/400, 410, 463; 379/102.03, 201.02–201.06, 379/413.02; 455/716–719, 740
See application file for complete search history.

(56) References Cited

U.S. PATENT DOCUMENTS

| | | | |
|---|---|---|---|
| 5,239,584 A | 8/1993 | Hershey et al. | 380/28 |
| 5,440,545 A | 8/1995 | Buchholz et al. | 370/60 |
| 5,444,781 A | 8/1995 | Lynn et al. | 380/46 |
| 5,454,026 A | 9/1995 | Tanaka | |
| 5,465,399 A | 11/1995 | Oberholtzer et al. | |
| 5,481,535 A | 1/1996 | Hershey | |
| 5,483,676 A * | 1/1996 | Mahany et al. | 370/468 |
| 5,548,821 A * | 8/1996 | Coveley | 455/67.14 |
| 5,570,343 A | 10/1996 | Bishop et al. | |
| 5,621,894 A | 4/1997 | Menezes | |
| 5,673,319 A | 9/1997 | Bellare et al. | 713/181 |
| 5,710,885 A | 1/1998 | Bondi | |

(Continued)

FOREIGN PATENT DOCUMENTS

EP    0 862 143 A2    9/1998

(Continued)

OTHER PUBLICATIONS

Koutroubinas et al., "A New Efficient Access Protocol for Integrating Multimedia Services in the Home Environment", Aug. 1999, IEEE, IEEE Transactions on Consumer Electronics, vol. 45, Issue 3, pp. 481-487.*

(Continued)

*Primary Examiner*—Wing Chan
*Assistant Examiner*—Gregory Sefcheck
(74) *Attorney, Agent, or Firm*—Blakely, Sokoloff Taylor & Zafman

(57) ABSTRACT

A communication protocol that provides load balancing and/or test pattern information between devices is described. A first embodiment of the protocol provides such information via a data frame that is transmitted a definitive time after a special DTIM beacon is transmitted. This protocol provides full compliance with IEEE 802.11. The second embodiment of the protocol modifies the 802.11 beacon data structure with additional information elements.

32 Claims, 6 Drawing Sheets

U.S. PATENT DOCUMENTS

| | | | |
|---|---|---|---|
| 5,715,164 A | 2/1998 | Liechti et al. | 705/410 |
| 5,724,346 A | 3/1998 | Kobayashi et al. | 370/329 |
| 5,745,699 A | 4/1998 | Lynn et al. | 395/200 |
| 5,754,947 A | 5/1998 | Tanabe et al. | |
| 5,838,770 A | 11/1998 | Fukushima et al. | |
| 5,844,905 A | 12/1998 | McKay et al. | |
| 5,852,778 A | 12/1998 | Ladedz | |
| 5,881,055 A * | 3/1999 | Kondo | 370/311 |
| 5,881,104 A | 3/1999 | Akahane | |
| 5,889,772 A | 3/1999 | Fischer et al. | 370/346 |
| 5,898,681 A | 4/1999 | Dutta | |
| 5,901,362 A | 5/1999 | Cheung et al. | 455/525 |
| 5,953,426 A | 9/1999 | Windel et al. | 380/51 |
| 5,987,011 A * | 11/1999 | Toh | 370/331 |
| 5,987,062 A * | 11/1999 | Engwer et al. | 370/251 |
| 5,991,287 A | 11/1999 | Diepstraten et al. | |
| 6,002,932 A | 12/1999 | Kingdon et al. | 455/433 |
| 6,031,528 A | 2/2000 | Langfahl, Jr. | |
| 6,055,316 A | 4/2000 | Perman et al. | |
| 6,058,106 A | 5/2000 | Cudak et al. | 370/313 |
| 6,064,678 A | 5/2000 | Sindhushayana et al. | 370/470 |
| 6,067,297 A * | 5/2000 | Beach | 370/389 |
| 6,072,836 A | 6/2000 | Hardiman | |
| 6,115,390 A | 9/2000 | Chuah | |
| 6,115,610 A | 9/2000 | Goetz et al. | |
| 6,154,461 A | 11/2000 | Stuniolo et al. | 370/401 |
| 6,163,810 A | 12/2000 | Bhagavath et al. | |
| 6,173,411 B1 | 1/2001 | Hirst et al. | |
| 6,175,856 B1 | 1/2001 | Riddle | |
| 6,178,327 B1 | 1/2001 | Gomez | |
| 6,182,043 B1 | 1/2001 | Boldl | |
| 6,189,039 B1 | 2/2001 | Harvey et al. | |
| 6,192,230 B1 * | 2/2001 | van Bokhorst et al. | 370/311 |
| 6,215,876 B1 | 4/2001 | Gilley | 380/260 |
| 6,256,334 B1 | 7/2001 | Adachi | 375/132 |
| 6,259,701 B1 | 7/2001 | Shur et al. | |
| 6,330,231 B1 * | 12/2001 | Bi | 370/328 |
| 6,331,983 B1 | 12/2001 | Haggerty et al. | |
| 6,370,381 B1 | 4/2002 | Minnick et al. | 455/445 |
| 6,392,990 B1 | 5/2002 | Tosey et al. | |
| 6,404,756 B1 | 6/2002 | Whitehill et al. | |
| 6,434,134 B1 | 8/2002 | La Porta et al. | 370/338 |
| 6,438,108 B1 | 8/2002 | Kanljung et al. | |
| 6,438,365 B1 | 8/2002 | Balteanu | |
| 6,456,597 B1 * | 9/2002 | Bare | 370/252 |
| 6,456,860 B1 | 9/2002 | Nakagaki | 455/561 |
| 6,463,295 B1 | 10/2002 | Yun | |
| 6,465,399 B2 | 10/2002 | Koishikawa et al. | |
| 6,469,991 B1 | 10/2002 | Chuah | |
| 6,487,406 B1 | 11/2002 | Chang et al. | 455/426 |
| 6,522,888 B1 | 2/2003 | Garceran et al. | |
| 6,535,493 B1 | 3/2003 | Lee et al. | 370/329 |
| 6,538,764 B2 | 3/2003 | Ueda | |
| 6,553,015 B1 | 4/2003 | Sato | 370/331 |
| 6,577,609 B2 | 6/2003 | Sharony | 370/312 |
| 6,577,613 B1 | 6/2003 | Ramanathan | |
| 6,580,700 B1 | 6/2003 | Pinard et al. | 370/332 |
| 6,614,937 B1 | 9/2003 | Hwang | |
| 6,640,325 B1 | 10/2003 | Fischer | |
| 6,643,469 B1 | 11/2003 | Gfeller et al. | |
| 6,657,954 B1 | 12/2003 | Bird et al. | |
| 6,671,266 B1 | 12/2003 | Moon et al. | |
| 6,687,247 B1 | 2/2004 | Wilford et al. | |
| 6,690,659 B1 | 2/2004 | Ahmed et al. | 370/328 |
| 6,697,336 B1 | 2/2004 | Socher | |
| 6,697,378 B1 | 2/2004 | Patel | 370/468 |
| 6,701,361 B1 | 3/2004 | Meier | 709/224 |
| 6,714,514 B1 | 3/2004 | Espax et al. | 370/230 |
| 6,721,032 B2 | 4/2004 | Hasegawa et al. | |
| 6,745,013 B1 | 6/2004 | Porter | |
| 6,795,407 B2 * | 9/2004 | Chesson | 370/311 |
| 6,807,146 B1 * | 10/2004 | McFarland | 370/208 |
| 6,842,605 B1 | 1/2005 | Lappetelainen et al. | |
| 6,873,627 B1 | 3/2005 | Miller et al. | |
| 6,891,855 B2 | 5/2005 | Bruckman | |
| 6,947,483 B2 | 9/2005 | Engwer | |
| 6,956,867 B1 | 10/2005 | Suga | |
| 2001/0048744 A1 | 12/2001 | Kimura | |
| 2002/0009199 A1 | 1/2002 | Ala-Laurila et al. | 380/247 |
| 2002/0037014 A1 | 3/2002 | Myojo et al. | |
| 2002/0045428 A1 * | 4/2002 | Chesson | 455/115 |

FOREIGN PATENT DOCUMENTS

| | | |
|---|---|---|
| WO | WO9826523 | 6/1998 |

OTHER PUBLICATIONS

Information technology—Telecommunications and information exchange between systems—local and metropolitan area networks—Specific requirements—Part 11: Wireless LAN Medium Access Control (MAC) and Physical Layer (PHY) Specifications; LAN MAN Standards Committee of the IEEE Computer Society, Reaffirmed Jun. 12, 2003, IEEE-SA Standards Board.

Khayata, R. Ellen, et al., "A Distributed Medium Access Protocol for Wireless LANs", *IEEE Transactions on Communications*, (1995),238-242.

Chi-Chun Lo, et al.: "QoS provisioning in handoff algorithms for wireless LAN," International Zurich Seminar on Broadband Communications. Accessing, Transmission, Networking, Feb. 17, 1998, pp. 9-16, XP002151137.

"IEEE standard for information technology—telecommunications and information exchange between systems—local and metropolitan area networks—specific requirement. Part 11: wireless LAN medium access control (MAC) and physical layer ANSI/IEEE Std 802.11-1999)" ISO/IEC 8802-11, ANSI/IEEE STD 802.11, Aug. 20, 1999, pp. 38-54 XP002206839.

Information technology—Telecommunications and information exchange between systems—local and metropolitan area networks—Specific requirements—Part 11: Wireless LAN Medium Access Control (MAC) and Physical Layer (PHY) Specifications; LAN MAN Standards Committee of the IEEE Computer Society, Reaffirmed Jun. 12, 2003, IEEE-SA Standards Board.

U.S. Appl. No. 09/751,332, Darwin A., Engwer et al.

Koutroubinas, Stelios, et al., "A New Efficient Access Protocol for Integrating Multimedia Services in the Home Environment", *IEEE Transactions on Consumer Electronics*, vol. 45, Issue 3, (Aug. 1999),481-487.

European Patent Search, Application No. 07010482.3 Mailed Jul. 27, 2007.

* cited by examiner

SEAMLESS ROAMING OPTIONS IN AN IEEE 802.11 COMPLIANT NETWORK

This application claims benefit of U.S. Provisional Application No. 60/226,403, filed Aug. 18, 2000.

FIELD OF THE INVENTION

The present invention relates to the field of networking. In particular, this invention relates to a protocol for providing load balancing and test pattern signal evaluation information to wireless units in accordance with Institute of Electrical and Electronics Engineers (IEEE) 802.11 constraints.

BACKGROUND OF THE INVENTION

The ability of users to access programs and share data over local area networks (referred to as "LANs") has become a necessity for most working environments. To improve efficiency and ease of use, certain enhancements may be added to a LAN such as remote wireless access. By providing remote wireless access, a wireless LAN (WLAN) is formed.

As described in U.S. Pat. No. 5,987,062 issued to Netwave Technologies, Inc., now owned by Nortel Networks Limited, one type of WLAN employs dedicated stations, which are referred to as access points (APs). Therein, each AP is a relay station that includes a radio frequency (RF) transceiver that receives radio data packets from a mobile unit such as a notebook-type computer with a suitable adapter card as described in U.S. Pat. No. 5,987,062. Thereafter, the AP transmits the data packets to the fixed backbone network. Of course, the AP may receive data from the fixed, backbone network and transmit it to one or more mobile units.

As further described in U.S. Pat. No. 5,987,062, with respect to the wireless communications protocol of this WLAN, each AP changes its radio frequency (channel) approximately ten times per second for both transmitting and receiving. The time period between each channel change is referred to as a "hop". To communicate with any given AP, a mobile unit needs to determine if the AP exists, on which channel the AP is operating, as well as when and on which channel it will operate next. To assist in this determination, each AP transmits two types of special broadcast messages, referred to as "Short Beacons" and "Long Beacons".

An AP transmits Short Beacons many times a second if the AP has no other traffic to relay. If the AP is busy, the Short Beacons are transmitted at a lower rate. Herein, a Short Beacon announces identification information about the AP such as the AP name, hop sequence, AP Internet Protocol (IP) information, and load balancing information. A Long Beacon, however, is transmitted at the start of each new hop. The Long Beacon includes the identification information found in a Short Beacon as well as a communication test pattern. This communication test pattern is static in nature, which allows mobile units to calculate the quality of a radio signal from the AP by comparing the received test pattern to an actual pattern stored in its internal memory. The mobile units make roaming decisions between APs based on the signal quality.

However, this communications protocol is not compliant with IEEE 802.11. In accordance with IEEE 802.11, APs transmit only two types of beacons, namely Traffic Indication Maps (TIMs) and Delivery Traffic Indication Messages (DTIMs). Both of these beacons have specific size limitations, and thus, cannot accommodate the information contained in a Short Beacon or Long Beacon. Also, both TIM and DTIM beacons have content constraints. Currently, the approved content for each of these beacons does not include the AP name, AP IP address information, load balancing information, or a test pattern. Thus, it would be desirable to develop a communications protocol that provides at least load balancing and/or test pattern information to wireless units while being either compatible or fully compliant with IEEE 802.11.

SUMMARY OF THE INVENTION

The present invention relates to communication protocols to provide load balancing and/or test pattern information between devices. A first embodiment is to provide such information via a data frame that is transmitted a definitive time after a special DTIM beacon is transmitted. This protocol provides full compliance with IEEE 802.11. The second embodiment is to modify the 802.11 beacon data structure with additional information elements.

Other aspects and features of the present invention will become apparent to those ordinarily skilled in the art upon review of the following description of specific embodiments of the invention in conjunction with the accompanying claims and figures.

BRIEF DESCRIPTION OF THE DRAWINGS

The features and advantages of the present invention will become apparent from the following detailed description of the present invention in which.

DETAILED DESCRIPTION OF THE INVENTION

Herein, the exemplary embodiments of the present invention relate to a protocol for providing static load balancing and test pattern signal evaluation information to wireless units while still maintaining compliance with Institute of Electrical and Electronics Engineers (IEEE) 802.11. These embodiments are not exclusive; rather, they merely provide a thorough understanding of the present invention. Well-known circuits are not set forth in detail in order to avoid unnecessarily obscuring the present invention.

In the following description, certain terminology is used to describe features of the present invention. For example, "logic" includes hardware and/or software module(s) that perform a certain function on incoming information. A "software module" is executable code such as an operating system, an application or an applet for example. The term "information" is defined as data, address, and/or control. For transmission, the information may be placed in a frame featuring a single data packet or a series of data packets.

In addition, a "link" is broadly defined as one or more information-carrying mediums to establish a communication pathway. Examples of the medium include a physical medium (e.g., electrical wire, optical fiber, cable, bus traces, etc.) or a wireless medium (e.g., air in combination with wireless signaling technology).

Figure 1:
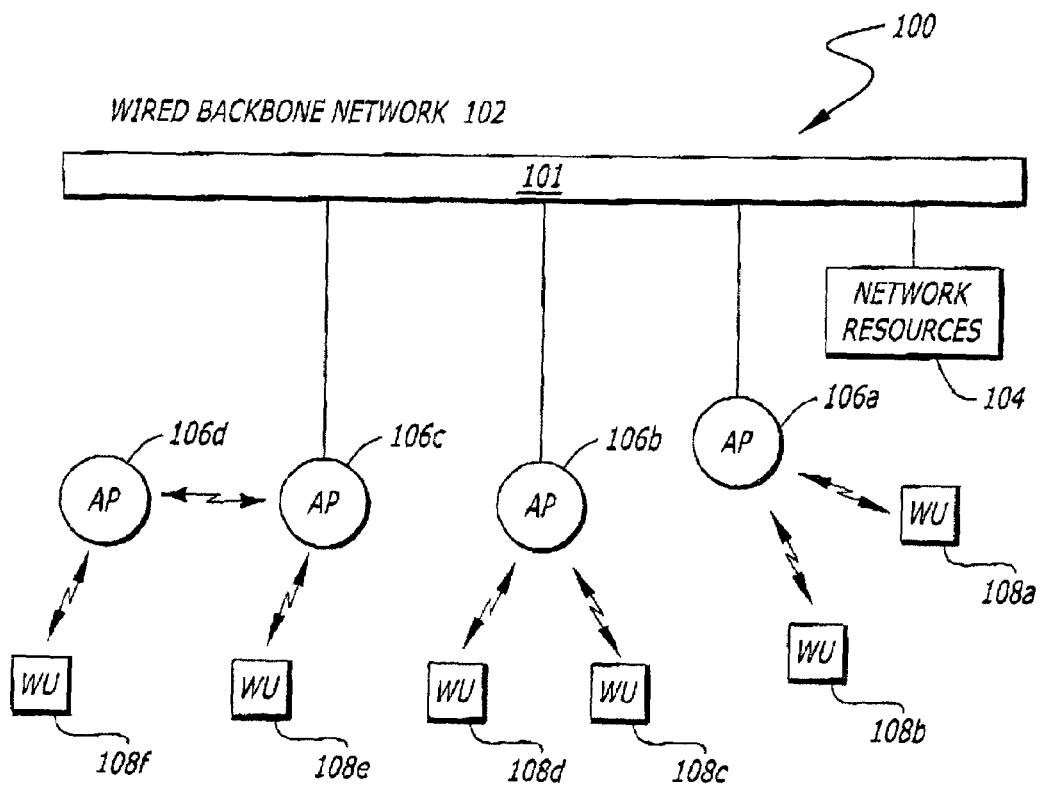
FIG. 1 is a first exemplary embodiment of a wireless network system.

Referring to FIG. 1, an exemplary first embodiment of a wireless network system 100 in accordance with the invention is illustrated. The wireless network system 100 comprises a link 101 based on a physical medium. Herein, the link 101 is part of a wired backbone network 102 that includes network resources 104 available for users of the system 100. The wireless network system 100 further includes one or more access points (APs) 106a-106d that communicate via a wireless link with one or more wireless units (WUs) 108a-108f. For this embodiment, four (4) APs 106a-106d communicate with six (6) WU 108a-108f.

Users using the WUs 108a-108f can access the network resources 104 via any of the APs 106a-106d, which are generally transparent bridges that link a wireless network defined by one or more WUs 108a-108f with the wired backbone network 102. The WUs 108a-108f communicate with the APs 106a-106d typically using a standardized protocol, such as the IEEE 802.11 protocol.

A "wireless unit" (WU) is defined herein as any electronic device comprising processing logic (e.g., a processor, microcontroller, state machine, etc.) and a wireless transceiver for receiving and transmitting data to an access point (AP) or another wireless unit (WU). Examples of a WU include a computer (e.g., desktop computer, laptop computer, handheld computer such as a personal digital assistant "PDA", etc.), communications equipment (e.g., pager, telephone, facsimile machine, etc.), a television set-top box, or appliances such as refrigerator pads, electronic picture frames, alarm detectors, water detectors, and the like. The WU is loaded with software to detect and extract load balancing and/or test patterns from payloads of data frames following special beacons as described below.

An "access point" (AP) is a device that provides a bi-directional connection between one or more WUs and a network such as the wired backbone network 102. However, an AP could also have a wireless connection back to the backbone network 102, such as AP 106d, which has a wireless link to the backbone network 102 via another AP 106c. The wired backbone network can be of any type, including an Ethernet, a token ring, and an asynchronous transfer mode (ATM) network.

Figure 2:
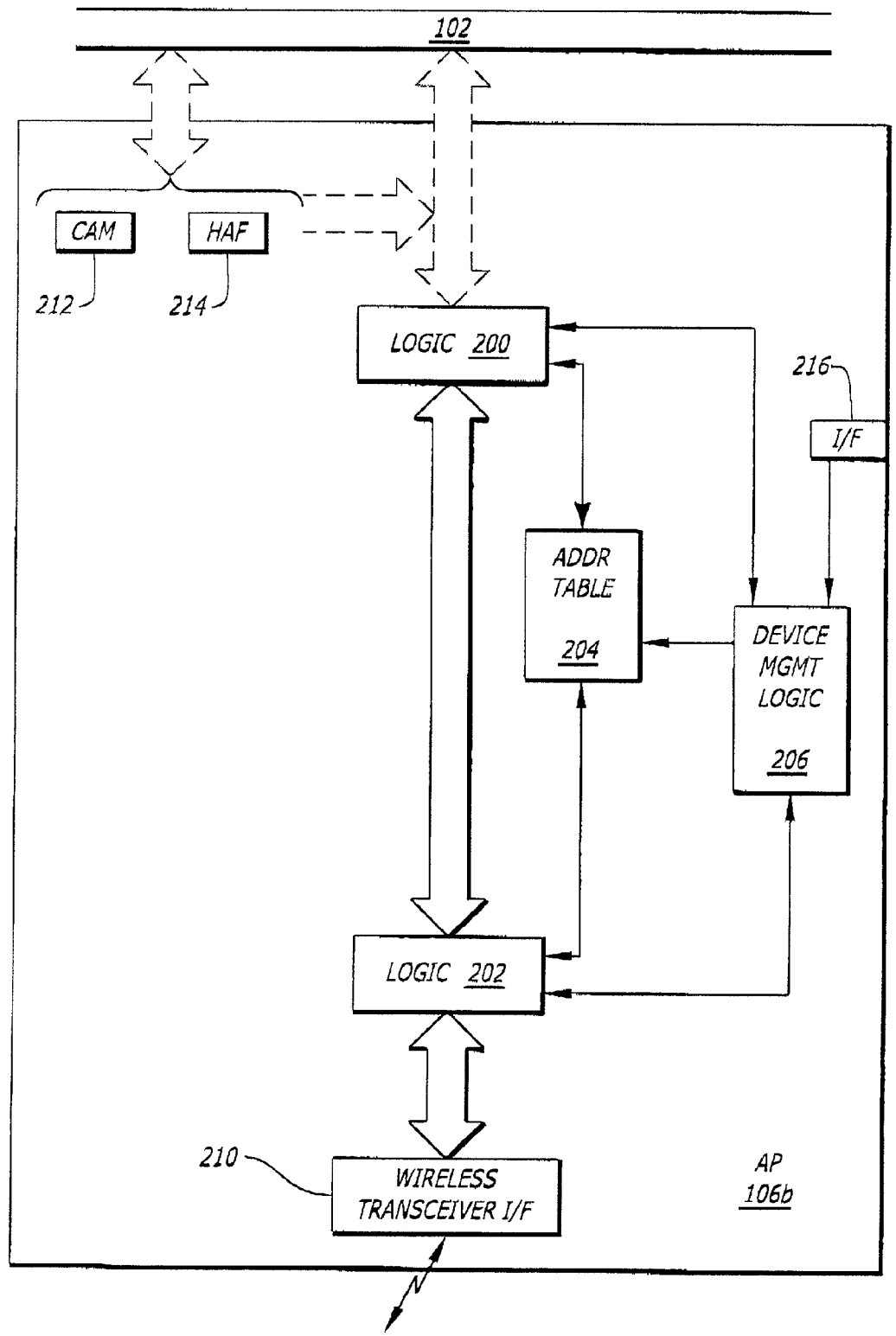
FIG. 2 is an exemplary embodiment of an access point (AP) of a wireless network system.

Referring now to FIG. 2, an exemplary embodiment of an access point (AP) is shown. For illustrative purposes, the access point is represented by AP 106b and differs in function from the access points described in U.S. Pat. No. 5,987,062. As shown, AP 106b comprises logic 200 and 202, an address table 204, a device management logic 206, and a wireless transceiver interface 210. In particular, the logic 200 is used to determine whether certain information from the wired backbone network 102 is destined for one or more of the WUs. The address table 204 includes Medium Access Control (MAC) addresses for all of the wireless units associated with the AP 106b such as WUs 108c and 108d of FIG. 1. In the special case of all broadcast or some multicast packets, the packets are addressed to all or some of the wireless units (WUs) associated with the access point (AP) on a "best effort" basis.

Similarly, as information from the wireless units (WU) is received by the wireless transceiver 210, the logic 202 monitors addresses within this information against the contents of the address table 204. One reason is that only information from authenticated and associated wireless units (e.g., WUs 108c and 108d) is accepted. Hence, if a non-authenticated wireless unit transmits packets, these packets will not be forwarded to the wired backbone network 102 of FIG. 1. The logic 202 subsequently transmits the information to the logic 200 for routing to the wired backbone network 102.

In the event that the fixed backbone network 102 of FIG. 1 has a substantially larger data rate than the wireless network, content addressable memory (CAM) 212 and a hardware address filter (HAF) 214 may be employed within the AP 106b. The CAM 212 and HAF 214 are in communication with the fixed backbone network 102 and collectively filter information at the hardware level so that the logic 200 processes only a small portion of the information routed over the wired backbone network 102.

The device management logic 206 provides a mechanism for adjusting the various parameters and controlling the functionality of the AP 106b. The device management logic 206 may be configured via an interface 216 (e.g., serial port) within the AP 106b. The interface 216 provides a direct connection to the AP 106b. Other mechanisms include (1) Simple Network Management Protocol (SNMP) management tools such as OPTIVITY® by Nortel Networks Limited, (2) TELNET, or (3) web-based management software.

Referring back to FIG. 1, in the typical scenario, a WU associates itself with one of the APs to communicate with the wired backbone network 102. For instance, in the example shown in FIG. 1, WUs 108a and 108b are associated with AP 106a, WUs 108c and 108d are associated with AP 106b, WU 108e is associated with AP 106c, and WU 108f is associated with wireless AP 106d. Which access point (AP) a wireless unit (WU) is associated with can depend on many factors, including signal quality, load balancing, restricted links and other factors. The AP that a particular WU is associated with can change, such as when the WU "roams" from the coverage area of a particular AP to a coverage area of another AP. From the standpoint of the user using the WU, this change in associated AP is transparent.

Figure 3:
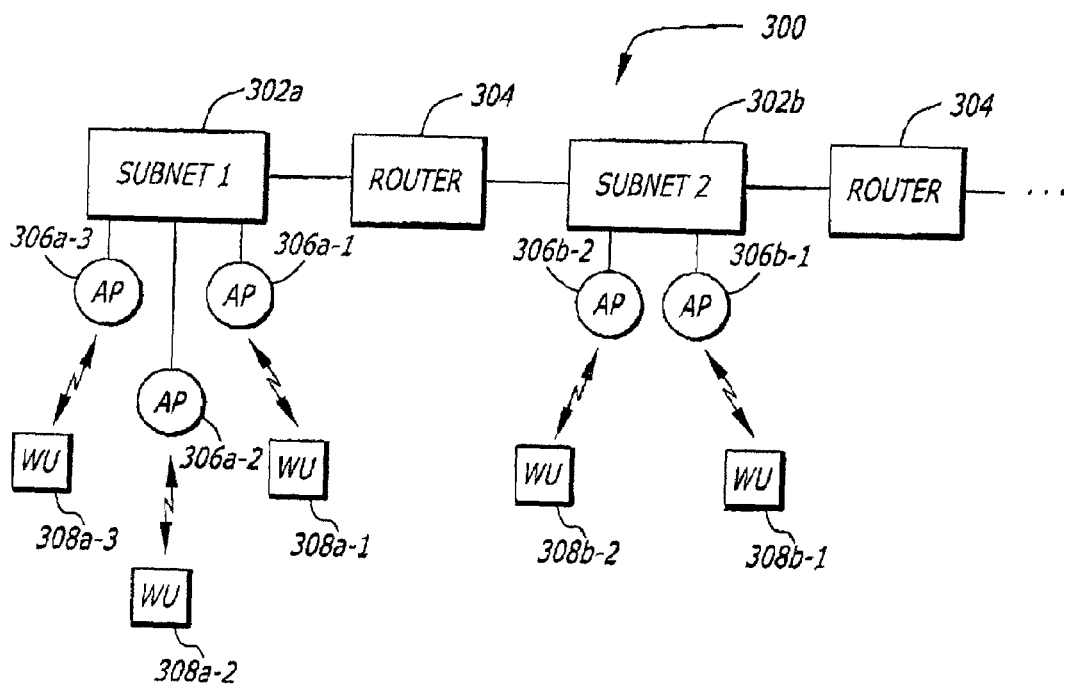
FIG. 3 is a second exemplary embodiment of a wireless network system.

FIG. 3 illustrates a second exemplary embodiment of a wireless network system 300 in accordance with the invention. The wireless network system 300 comprises two or more sub-networks 302a and 302b, which communicate with each other by way of a router 304. The sub-networks 302a and 302b can be any wired backbone network, including Ethernet, token ring, and an asynchronous transfer mode (ATM) network. The sub-networks 302a and 302b need not be of the same type, for instance, sub-network 302a can be an Ethernet, and sub-network 302b can be a token ring. Each sub-network 302a and 302b has one or more APs for communicating with the WU. For instance, sub-network 302a includes APs 306a-1, 306a-2, 306a-3 for communicating respectively with WUs 308a-1, 308a-2, and 308a-3. Sub-network 302b includes APs 306b-1 and 306b-2 for communicating respectively with WUs 308b-1 and 308b-2. In this system, a WU associated with an AP on a particular sub-network (e.g. sub-network 302a) can also change its association to an AP on another sub-network (e.g. sub-network 302b) by roaming as discussed above or other circumstances.

Figure 4:
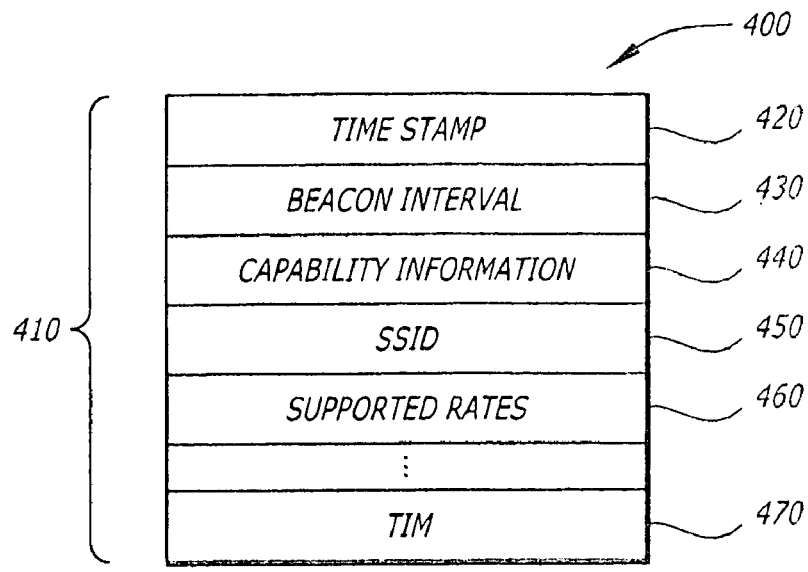
FIG. 4 is an exemplary embodiment of a data structure of a beacon.

Referring now to FIG. 4, an exemplary embodiment of the data structure of a beacon 400 is shown. In accordance with Section 7.2.3.1 of IEEE 802.11, one embodiment of the beacon 400 is a control frame transmitted from an AP to one or more WUs. The beacon 400 comprises, in part, a plurality of information elements 410, namely specific data packets forming the beacon 400. These information elements 410 include a timestamp element 420, a beacon interval element 430, a capability information element 440, a service set identity (SSID) element 450, a supported rates element 460 and a traffic indication map (TIM) 470 as shown in FIG. 5.

Figure 5:
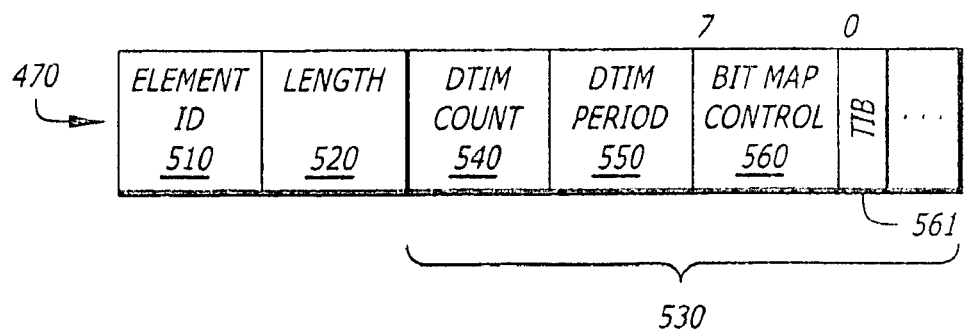
FIG. 5 is an exemplary embodiment of the TIM element of the beacon of FIG. 4.

Referring to FIG. 5, an exemplary embodiment of the TIM information element 470 is shown. The TIM information element 470 comprises (1) an Element Identification (ID) field 510, (2) a Length field 520 and (3) one or more element-specific Information fields 530. The Element ID field 510 contains a unique value to identify the specific type of information element while the Length field 520 specifies the number of octets in the Information field(s) 530.

Information fields 530 comprise at least a delivery traffic indication message (DTIM) Count field 540, a DTIM Period field 550 and a Bitmap Control field 560. The DTIM Count field 540 is a single octet that indicates how many TIMs (including the current frame) appear before the next DTIM. If the value of the DTIM Count field 540 is zero, the beacon is a DTIM. The DTIM Period field 550 is a single octet that indicates the number of TIM intervals between successive DTIMs. The Bitmap Control field 560 is a single octet that includes a traffic indicator bit (bit 0) 561. When one or more broadcast or multicast data frames are buffered at the AP, the DTIM Count field 540 is zero and the traffic indicator bit (TIB) 561 is set to denote pending subsequent transmissions. Hence, upon receipt of the beacon 400, any wireless unit is aware that one or more multicast or broadcast data frames will be transmitted subsequent to the DTIM.

Figure 6:
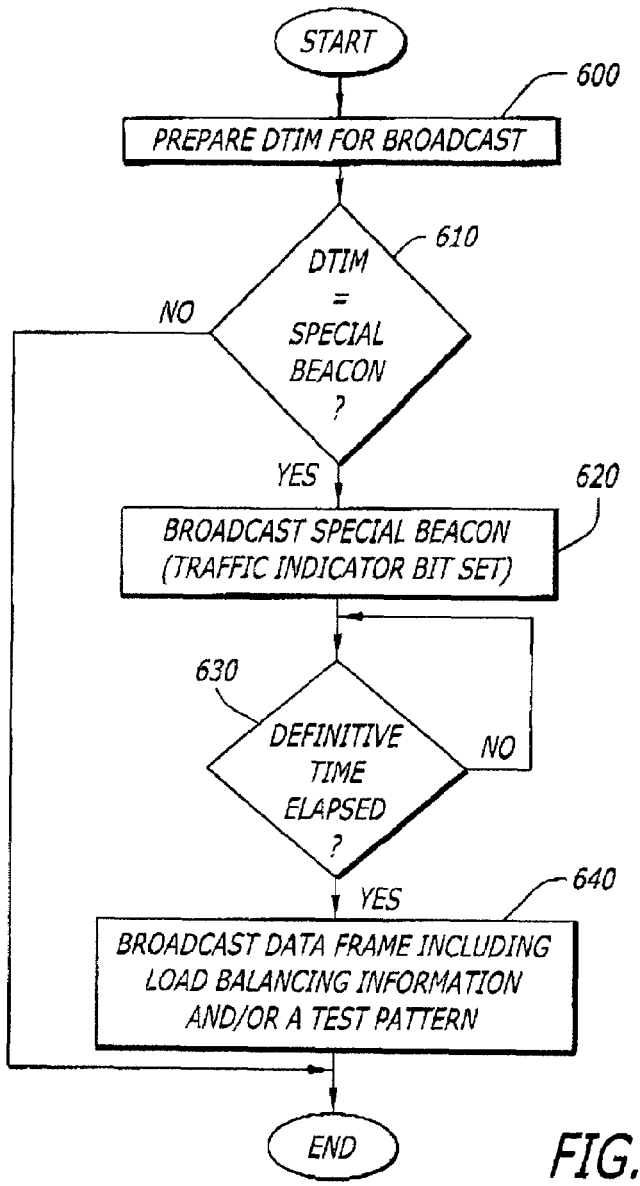
FIG. 6 is an exemplary embodiment of the operations of an AP in full compliance with IEEE 802.11.
Figure 7:
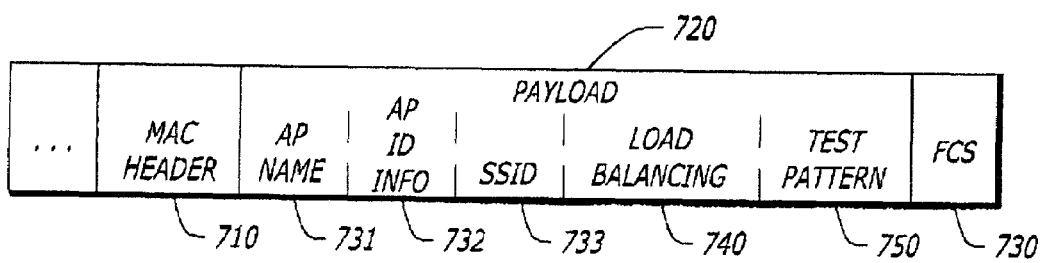
FIG. 7 is an exemplary embodiment of a data frame transmitted after a special DTIM beacon.

Referring now to FIGS. 6 and 7, an exemplary embodiment of the operations of a device, for example, an AP in accordance with the invention, is shown. As shown in FIG. 6, an AP prepares a DTIM beacon for broadcast to the wireless units (block 600). For each DTIM beacon or perhaps selectively chosen DTIM beacons (referred to as a "special DTIM beacon") as shown, the traffic indicator bit will be set to denote a subsequent transmission (e.g., a data frame) (block 610). The selection may be random, pseudo-random or in accordance with a predetermined, alternating pattern.

Thereafter, upon completing the broadcast of the special DTIM beacon (block 620), the AP broadcasts a data frame that includes load balancing information and/or a test pattern as described below and shown in FIG. 7 (blocks 640). In this embodiment, the AP broadcasts the data frame after a definitive time period has elapsed since the special DTIM beacon was broadcast (block 630).

For example, the data frame may be a first frame that is broadcast after the special DTIM beacon. This reduces the amount of time that the wireless units must remain powered-on and tuned to a certain channel in the event that the wireless unit is in a power-save mode. More specifically, since beacons occur at predictable times, the wireless unit tunes to a particular AP channel long enough to hear the beacon. Then, it tunes back to its own AP channel. In essence, the beacons are sent periodically and at times known in advance to the receiver.

As shown in FIG. 7, an exemplary embodiment of the data frame is shown. The data frame 700 includes a media access control (MAC) header 710, a payload 720 and a frame check sequence (FCS) 730. The payload 720 includes AP name 731, AP ID information 732, a SSID element 733, balancing information 740 and/or a test pattern 750.

More specifically, the load balancing information 740 is data that provides, among other things, certain characteristics of the wireless units in communication with any given AP. This data may include, but is not limited or restricted to the following: a count of the number of WUs currently associated with the AP, a count of associated WUs that are "busy" (sending/receiving data at a rate or volume that exceeds a threshold), an indicator as to whether the AP is able to access any additional WUs, an indicator of the total utilization level of the AP, number of (wireless) hops to the wired backbone network, speed of the uplink from the AP to the backbone network, and/or memory capacity for buffering. Load balancing is possible because each wireless unit registers with its selected AP and the selected AP may maintain a list of the wireless units that it is servicing in its address table.

The test pattern 750 is a static bit pattern, which allows wireless units to calculate the quality of a radio signal from the AP by comparing the received test pattern to an actual pattern stored in its internal memory to assist in roaming decisions. This allows direct measurement of bit errors. Of course, non-receipt of the test pattern conveys useful information as to the quality of the radio signal as well.

Figure 8:
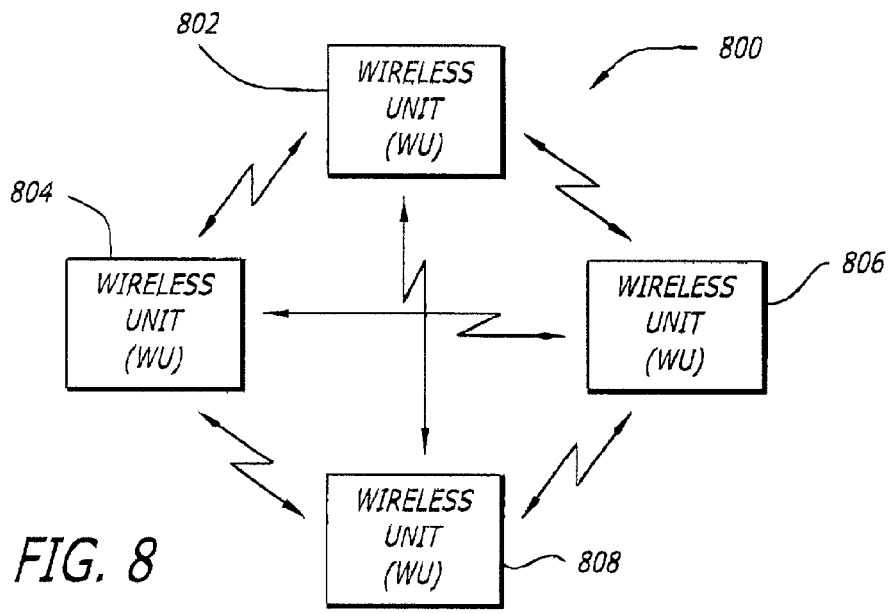
FIG. 8 is a third exemplary embodiment of a wireless "ad hoc" network system.

Referring to FIG. 8, a third exemplary embodiment of another wireless network system 800 in accordance with the invention is shown. The wireless network system 800 comprises two or more wireless units (WU) that can communicate with each other via a wireless link. In this example, four WUs 802, 804, 806 and 808 are shown, each of which can communicate with the remaining units via the wireless link. In contrast to the wireless network systems of FIGS. 1 and 3, this wireless network system 800 does not use a wired backbone network or APs. This type of system 800 is known in the relevant art as an "ad hoc" wireless network system.

Figure 9:
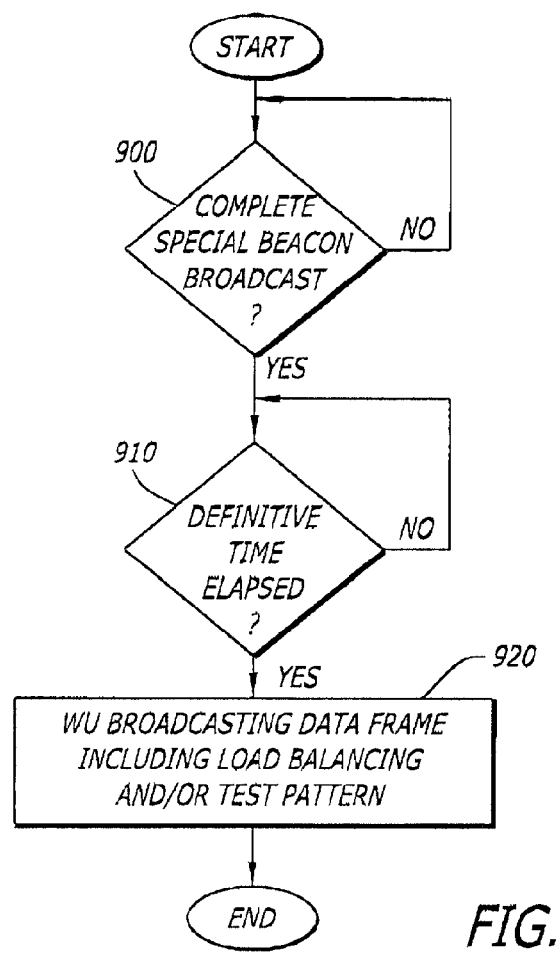
FIG. 9 is an exemplary embodiment of the operations of a WU to provide load balancing and/or test patterns.

In accordance with this embodiment, it is contemplated that DTIMs may be generated from a wireless unit (WU). Thus, as shown in FIG. 9, upon completing the broadcast of a special beacon by the WU (block 900), the WU broadcasts a data frame that includes load balancing information and/or a test pattern as described above and shown in FIG. 7 (block 920). In this embodiment, the Wu broadcasts the data frame after a definitive time period has elapsed since the special DTIM beacon was broadcast (block 910). For example, the data frame is the $N^{th}$ frame that is broadcast after the special DTIM beacon (where $N \geq 1$).

Figure 10:
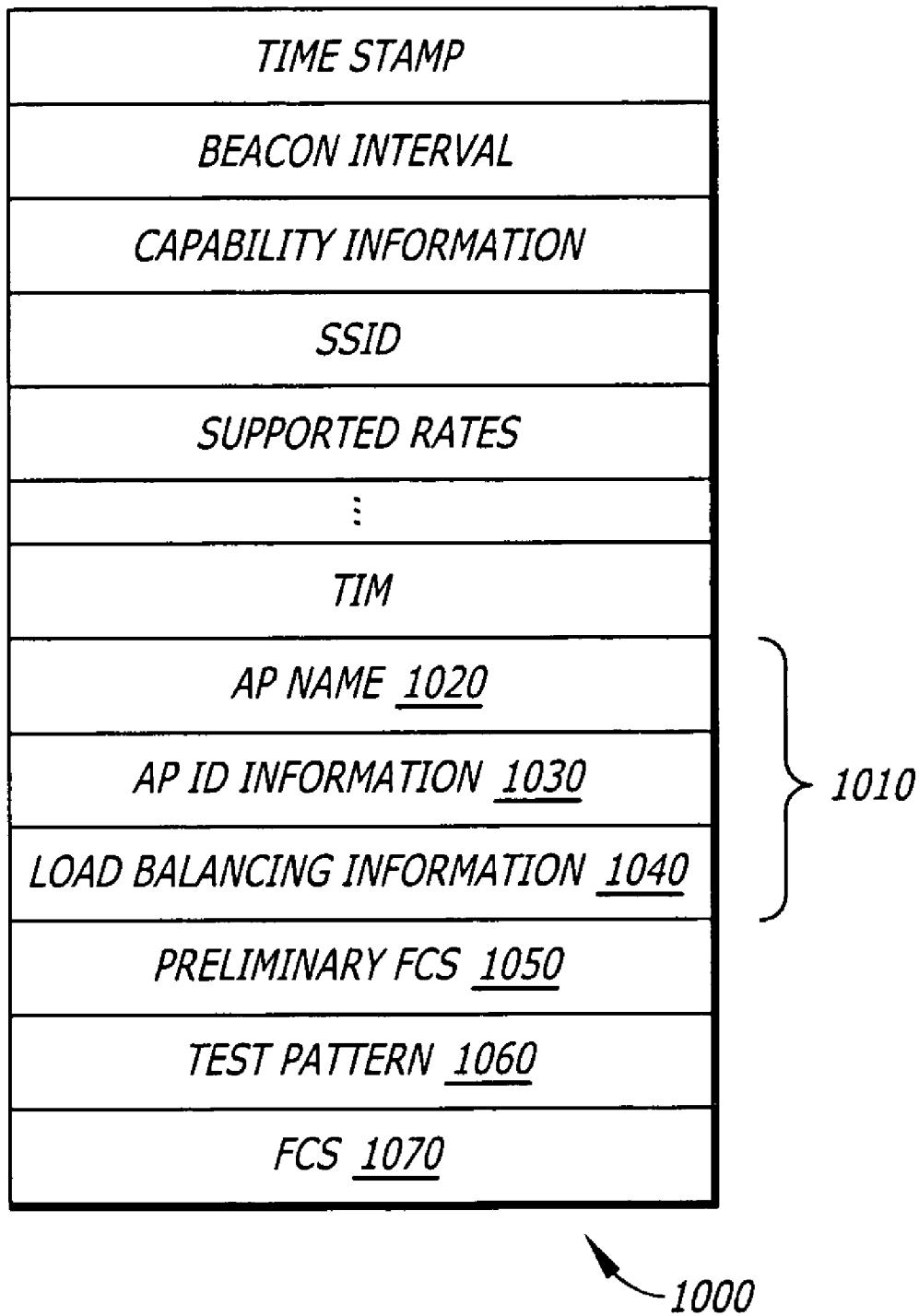
FIG. 10 is an exemplary embodiment of the operations of an AP in partial compliance with IEEE 802.11.

Referring now to FIG. 10, a second exemplary embodiment of the present invention is shown. As shown, a device (e.g., AP) is configured to broadcast a modified beacon 1000 for receipt by the wireless units. In a first embodiment, each modified beacon (e.g., DTIM) 1000 includes a plurality of additional information elements 1010 such as one or more of the following: AP name 1020, AP ID information 1030, and/or load balancing information 1040. A preliminary frame check sequence (FCS) information element 1050 is placed in the modified DTIM 1000 after the additional information elements 1010. Moreover, after the preliminary FCS 1050, the modified DTIM 1000 may include a test pattern 1060 followed by the normal frame check sequence 1070 as defined in the IEEE 802.11 Standard for the modified beacon 1000 as a whole. The preliminary FCS 1050 allows the receiver to confirm that the MAC header and other beacon information elements were received correctly, even if the test pattern contains bit errors.

In a second embodiment, all of the beacons, including both TIMs and DTIMs, are modified to include the additional information elements 1010 and/or the communications test pattern 1060. In a third embodiment, certain TIMs are configured to include the additional information elements 1010 while others are configured to include the communications test pattern 1060. In a fourth embodiment, specific TIMs and DTIMs are configured to include the additional information elements 1010 and/or the communications test pattern 1060 in accordance with a predetermined alternating pattern.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For instance, it is contemplated that the inventive aspects may be employed in a network that is non-compliant with IEEE 802.11 standards.

What is claimed is:

1. A method comprising:
broadcasting a special delivery traffic indication message (DTIM) beacon by an access point, the special DTIM beacon comprising a field having a traffic indicator bit that is set to denote a transmission of a data frame as defined by an Institute of Electrical and Electronics Engineers IEEE 802.11 standard after the DTIM beacon; and
broadcasting by the access point the data frame being a first frame transmitted after broadcasting the special DTIM beacon with the broadcasting of the data frame being conducted in its response to the broadcasting the special DTIM, the data frame comprises at least load balancing information for use by a wireless unit to determine whether to establish communications with the access point.

2. The method of claim 1, wherein the special DTIM beacon is configured in accordance with the institute of Electrical and Electronics Engineers (IEEE) 802.11 Standard, 1999 edition and the traffic indicator bit is within the TIM information element.

3. The method of claim 1, wherein the data frame further comprises a test pattern.

4. The method of claim 3, wherein the test pattern is a static bit pattern.

5. The method of claim 1, wherein the broadcasting of both the special DTIM beacon and the data frame is performed by an access point to a device being a wireless unit of a plurality of wireless units, the data frame being transmitted as the first frame after the special DTIM beacon in order to reduce an amount of time that the wireless unit remains powered-on when the wireless unit is in a power-save mode.

6. The method of claim 5, wherein the load balancing information is computed from information pertaining to characteristics of the wireless unit in communication with the access point.

7. The method of claim 5, wherein the load balancing information comprises a count of a number of wireless units currently associated with the access point.

8. The method of claim 5, wherein the load balancing information comprises an indicator as to whether the access point is able to accept one or more additional wireless units.

9. The method of claim 5, wherein the load balancing information comprises a value corresponding to a speed of an uplink from the access point to a backbone network at which the access point is coupled.

10. The method of claim 5, wherein the load balancing information comprises a count of a number of wireless units exchanging data with the access point at a rate or volume that exceeds a predetermined threshold.

11. The method of claim 5, wherein the device is a wireless unit.

12. A method comprising:
broadcasting a special delivery traffic indication message (DTIM) beacon by an access point, the special DTIM beacon comprising a field having a traffic indicator bit that is set to denote a transmission of a data frame as defined by an Institute of Electrical and Electronics Engineers IEEE) 802.11 standard after the DTIM beacon; and
broadcasting the data frame being a first frame transmitted by the access point after and directly in response to the special DTIM beacon in order to reduce an amount of rime required by a wireless unit in a power-save mode to remain powered-on to receive the data frame, the data frame including at least load balancing information by the access point.

13. The method of claim 12, wherein the load balancing information includes a count being a number of wireless units in communications with the access point that exceed either a threshold data transmit rate or a threshold data receive rate.

14. A method comprising:
providing an access point; and
broadcasting a modified beacon from the access point to a plurality of wireless units, the modified beacon comprises (i) a plurality of information elements comprising an access point name, an access point Internet Protocol (IP) information and a load balancing information being information pertaining to characteristics of the plurality of wireless units for use by the plurality of wireless units to determine whether to establish communications with the access point, (ii) a first frame check sequence associated with the plurality of information elements to confirm that the plurality of information elements were received correctly, and (iii) a second frame check sequence associated with the plurality of information elements and the first frame check sequence.

15. The method of claim 14, wherein the modified beacon further comprises (iv) a test pattern so that the second frame check sequence is associated with the plurality of information elements, the first frame check sequence and the test pattern and the first frame check sequence enables confirmation that the plurality of information elements are correctly received even if the test pattern contains error bits.

16. The method of claim 14, wherein the load balancing information within the modified beacon includes a count of the plurality of wireless units that are sending or receiving data with the access point at a rate or volume above a threshold level.

17. The method of claim 14, wherein the modified beacon is one of a traffic indication map (TIM) beacon and a delivery traffic indication message (DTIM) beacon, both the TIM beacon and the DTIM beacon being devoid of any data slots.

18. The method of claim 14, wherein the load balancing information includes an indicator of a total utilization level of the access point.

19. The method of claim 14, wherein the load balancing information includes a number of wireless hops to a wired backbone network with which the access point is in communication.

20. The method of claim 14, wherein the load balancing information includes an uplink speed from the access point to the wired backbone network.

21. A method comprising:
modifying a beacon to produce a modified beacon, the modified beacon comprises a plurality of additional information elements comprising an access point name, an access point Internet Protocol (IP) information and a load balancing information being information pertaining to characteristics of at least one wireless unit in communication with an access point for use by a different wireless unit to determine whether to establish communications with the access point; and
transmitting the modified beacon by the access point.

22. The method of claim 21, wherein the modified beacon further comprises a first frame check sequence associated with the plurality of additional information elements and a test pattern, the first check sequence to confirm that the plurality of additional information elements were received correctly despite error bits in the received test pattern.

23. The method of claim 22, wherein the modified beacon further comprises the test pattern and a second frame check sequence for the modified beacon to confirm correct receipt of all information within the modified beacon.

24. The method of claim 21, wherein the modified beacon is a delivery traffic indication message (DTIM) beacon.

25. The method of claim 21, wherein the modified beacon is a traffic indication map (TIM) beacon.

26. The method of claim 21, wherein the beacon is configured in accordance with an Institute of Electrical and Electronics Engineers (IEEE) Standard 802.11, 1999 edition.

27. An access point comprising:
hardware logic to broadcast a special delivery traffic indication message (DTIM) beacon comprising a traffic indicator comprising a traffic indicator bit that is set to denote transmission of a data frame as defined by an Institute of Electrical and Electronics Engineers (IEEE) 802.11 standard; and
hardware logic to broadcast the data frame as a first frame transmitted by the access point after broadcasting the special DTIM beacon with the broadcast of the data frame being conducted in response to the broadcast the special DTIM in order to reduce an amount of time required by a wireless unit in a power-save mode to remain powered-on to receive the data frame, the data frame comprises at least one of a load balancing information and a test pattern.

28. The access point of claim 27, wherein the data frame broadcast from the access point comprises both the load balancing information and the test pattern.

29. The access point of claim 27, wherein the load balancing information comprises data pertaining to wireless units in communication with the access point and the access point.

30. The access point of claim 27, wherein the test pattern is a static bit pattern.

31. The access point of claim 27, wherein the logic broadcasts the data frame after a definitive time has elapsed after the special DTIM beacon has been broadcasted.

32. The access point of claim 27, wherein the special DTIM beacon is configured in accordance with the Institute of Electrical and Electronics Engineers (IEEE) 802.11 standard, 1999 edition.

* * * * *